Patented May 9, 1933

1,907,560

UNITED STATES PATENT OFFICE

JULIUS A. NIEUWLAND, OF NOTRE DAME, INDIANA, ASSIGNOR TO E. I. DU PONT DE NEMOURS & COMPANY, OF WILMINGTON, DELAWARE, A CORPORATION OF DELAWARE

USE OF FLUOBORIC AND FLUOSILICIC ACID IN ACETYLENE REACTIONS

No Drawing. Application filed August 30, 1928. Serial No. 303,101.

This invention relates to improvements in the method of carrying out catalytic reactions between acetylene and other compounds, and, more particularly, to reactions of the type in which mercuric oxide or mercury salts are ordinarily employed as catalysts in connection with acetylene.

It has long been known that mercuric oxide, mercuric sulphate, and certain other mercuric salts are vigorous catalysts for reactions between acetylene and other organic compounds. For example, in the presence of such a catalyst, and under otherwise suitable conditions, acetylene reacts with water to form acetaldehyde, with alcohols to form acetals, with aromatic amines, for example aniline, to form ethylidene amines, with hydrocarbons to form ethylidene hydrocarbons and with ethers, esters of hydroxy acids, etc. The use of such catalysts has been limited, however, because of the necessity of employing sulfuric acid to activate the mercuric oxide. The strength of the sulfuric acid varies with the individual reaction under consideration, but the sulfuric acid is frequently of such high concentration as to produce charring, and the formation of tar and other objectionable by-products. Acetaldehyde is made commercially by this reaction, but no other commercial development has taken place.

This invention has as its object the substitution, in the mercury catalysis of acetylene reactions, of non-charring acids for the sulfuric acid commonly employed. This permits of carrying out such reactions without the formation of objectionable side reactions and tarry products, and a consequent increase in the yield of usable acetylene derivatives.

Hydrochloric and hydrobromic acids inhibit the catalysis, a fact in agreement with the non-catalytic properties of mercuric chloride and bromide. It has therefore been supposed that halogens generally inhibit the mercury catalysis of acetylene reactions.

It has now been found, however, that by substituting for sulfuric acid anhydrous fluoboric or fluosilicic acid, and carrying out the catalysis in the absence of water, that the characteristic mercury catalyzed reactions of acetylene take place smoothly and readily, without formation of tarry by-products. Alcohols yield acetals, phenols yield ethylidene ethers, and, in general, ethylidene or vinyl derivatives of phenols, alcohols, ethers, esters, amines, etc. are obtained.

The anhydrous acids may be conveniently made by passing into methyl or ethyl alcohol silicon or boron fluoride, prepared from boron or silicon oxide and hydrofluoric acid. The alcoholic solution of the resulting catalytic mixture of alkyl borate and fluoboric acid or alkyl silicate and fluosilicic acid may be conveniently used as the activating material in the mercury catalysis, five to ten parts of a 10% acid solution ordinarily sufficing. It is sufficient, however, in all cases to add to the alcoholic solution of the reagent, mercuric oxide and the anhydrous acid (fluosilicic or fluoboric) and pass in acetylene for the reaction to take place, the exact amounts of the acids and the mercury salt depending on the reagent in question, as does the optimum temperature. The mercury usually becomes exhausted fairly rapidly and additional portions of mercury must be added from time to time, but the acid appears to retain its activity indefinitely.

The following specific embodiments of the invention are presented for purposes of illustration.

Example 1

To 100 g. of glycerine there are added 10 g. of a 20% methyl alcohol solution of boron fluoride and 2 g. of mercuric oxide. Acetylene is then passed in till the increase in weight corresponds to one mole of acetylene per two moles of glycerine. The reaction product is then drowned in dilute ammonia solution, the oily layer separated and distilled to obtain the acetal of glycerine. A small amount of dimethyl acetal is attained as a by-product.

Example 2

To 100 g. of ethylene glycol ethyl ether are added 5 g. of a 20% solution of silicon fluoride in ethyl alcohol and the reaction carried out as in Example 1. The product is worked up in a similar manner.

Example 3

Same as Example 1, but using ethyl lactate instead of glycerine.

Example 4

Same as Example 1, but using aniline instead of glycerine.

Example 5

Same as Example 1, but using phenol instead of glycerine. A thick viscous liquid of high boiling point is obtained.

It is not necessary that the reaction be carried out in solution. If either the raw material to be reacted with acetylene or the reaction product is liquid, no solvent for the raw material is necessary. Only if both the raw material and reaction product are solids, is it necessary to employ a solvent for the raw material or reaction product.

When an alcohol is present as a solvent it reacts with the acetylene to form the corresponding acetal so that there is a wastage of acetylene corresponding to the amount of alcohol added as solvent for the catalytic acid. This accounts for the dimethyl acetal obtained as a by-product in Example 1. In order to avoid excesses of alcohol, an inert solvent may advantageously be employed to dissolve the solid raw material or the reaction product. Chlorbenzene is an example of an inert solvent generally applicable in such cases. Also, the aromatic hydrocarbons such as benzene and toluene may be used with fair success, but react to some extent themselves with acetylene.

Although the optimum temperature, as already noted, will vary with the reagents employed, in each of the examples given, the reaction was held between room temperature and 100° C.

Obviously, if the raw material to be treated with acetylene is an alcohol, the anhydrous acid may be prepared directly in the raw material and the acetylene, after the addition of the catalyst, passed into the anhydrous mixture.

Except in the case of the acetals produced by the action of acetylene upon the alcohols the chemical nature of the compounds obtained has not been definitely determined. It is believed, however, that in the case of the phenols the reaction products are probably the vinyl phenols; that with the aromatic amines, ethylidene aniline and its polymers are probably obtained, or the analogues where aromatic amines other than aniline are employed. With ethyl lactate the only information available is that a reaction occurs.

I claim:

1. In the process of forming compounds from acetylene which involves reacting an organic compound with acetylene in the presence of a mercuric catalyst, the step which comprises carrying out the reaction in the presence of an anhydrous acid of the group consisting of fluoboric and fluosilicic acids.

2. The process of reacting acetylene with an organic compound of the group consisting of alcohols, phenols, aromatic amines, hydrocarbons, ethers, and esters containing a free hydroxy group which comprises carrying out the reaction in the presence of a mercuric catalyst and an anhydrous acid of the group consisting of fluoboric and fluosilicic acids.

3. The process of forming an acetal which comprises reacting an alcohol with acetylene in the presence of a mercuric catalyst and an anhydrous acid of the group consisting of fluoboric and fluosilicic acids.

4. The process of forming an acetal which comprises reacting acetylene with a polyhydric alcohol in the presence of a mercuric catalyst and an anhydrous acid of the group consisting of fluoboric and fluosilicic acids.

5. In the process of forming compounds from acetylene which involves reacting an organic compound with acetylene in the presence of a mercuric catalyst, the step which comprises carrying out the reaction in the presence of a solution in a lower alcohol of an anhydrous acid of the group consisting of fluoboric and fluosilicic acids.

6. The process of reacting acetylene with an organic compound of the group consisting of alcohols, phenols, aromatic amines, hydrocarbons, ethers, and esters containing a free hydroxy group which comprises carrying out the reaction in the presence of mercuric oxide and a solution in a lower alcohol of an anhydrous acid of the group consisting of fluoboric and fluosilicic acids.

7. The process of forming the acetal of glycerine which comprises reacting acetylene with glycerine in the presence of a mercuric catalyst and a solution in a lower alcohol of an anhydrous acid of the group consisting of fluoboric and fluosilicic acids.

8. In the process of forming compounds from acetylene which involves reacting an organic compound with acetylene in the presence of a mercuric catalyst, the step which comprises carrying out the reaction in the presence of an anhydrous mixture prepared by passing into a lower alcohol a fluoride of the group consisting of boron and silicon fluorides.

9. The process of reacting acetylene with an organic compound of the group consisting of alcohols, phenols, aromatic amines, hydrocarbons, ethers and esters containing a free hydroxy group which comprises carrying out the reaction in the presence of a mercuric catalyst and an anhydrous mixture prepared by passing into a lower alcohol a fluoride of the group consisting of boron and silicon fluorides.

10. The process of forming the acetal of glycerine which comprises reacting acetylene with glycerine in the presence of a mercuric catalyst and an anhydrous mixture prepared by passing into a lower alcohol a fluoride of the group consisting of boron and silicon fluorides.

11. The process of reacting acetylene with an organic compound of the group consisting of alcohols, phenols, aromatic amines, hydrocarbons, ethers and esters containing a free hydroxy group which comprises carrying out the reaction in the presence of mercuric oxide, an inert solvent, and an anhydrous acid of the group consisting of fluoboric and fluosilicic acids.

12. The process of reacting acetylene with an organic compound of the group consisting of alcohols, phenols, aromatic amines, hydrocarbons, ethers and esters containing a free hydroxy group which comprises carrying out the reaction in the presence of mercuric oxide, chlorbenzene, and an anhydrous acid of the group consisting of fluoboric and fluosilicic acids.

13. A catalyst mixture, said mixture comprising a mercuric compound, an inert solvent and an anhydrous acid of the group consisting of fluoboric and fluosilicic acids.

14. A catalyst mixture, said mixture comprising mercuric oxide, chlor-benzene, and an anhydrous acid of the group consisting of fluoboric and fluosilicic acids.

15. The improvement in the known process of reacting acetylene with an organic compound in the presence of a mercuric catalyst containing sulfuric acid and water, which improvement comprises replacing the sulfuric acid and water by an anhydrous acid of the group consisting of fluoboric and fluosilicic acids.

16. The process of forming compounds from acetylene which comprises reacting an organic compound containing the group COH with acetylene in the presence of a mercuric catalyst and an anhydrous acid of the group consisting of fluoboric and fluosilicic acids.

17. The process of forming compounds from acetylene which comprises reacting acetylene with an organic compound containing the group RCOH, wherein R represents either hydrogen or a hydrocarbon radical, in the presence of a mercuric catalyst and an anhydrous acid of the group consisting of fluoboric and fluosilicic acids.

18. The process of forming an acetylene derivative of a phenol which comprises reacting acetylene with the phenol in the presence of a catalyst comprising a mercuric compound and an anhydrous acid of the group consisting of fluoboric and fluosilicic acids.

19. The process of forming an acetylene derivative of an aromatic amine which comprises reacting the acetylene and amine in the presence of a catalyst comprising a mercuric compound and an anhydrous acid of the group consisting of fluoboric and fluosilicic acids.

In testimony whereof, I affix my signature.

JULIUS A. NIEUWLAND.